United States Patent [19]

Hashimoto et al.

[11] 4,073,474
[45] Feb. 14, 1978

[54] POPPET VALVE

[75] Inventors: Kametaro Hashimoto; Kenji Ushitani; Yoichi Serino, all of Toyota; Tadaoki Arakawa, Seto, all of Japan

[73] Assignee: Toyota Jidosha Kogyo Kabushiki Kaisha, Toyota, Japan

[21] Appl. No.: 645,383

[22] Filed: Dec. 30, 1975

[30] Foreign Application Priority Data

Aug. 15, 1975 Japan .................................. 50-99389

[51] Int. Cl.² ........................................... F16K 24/00
[52] U.S. Cl. .................................. 251/368; 29/156.7 B; 123/188 AA; 228/112
[58] Field of Search .................. 29/156.7 R, 156.7 B; 251/368; 228/112; 123/188 A, 188 AA; 75/126 H, 171

[56] References Cited

U.S. PATENT DOCUMENTS

| 1,607,968 | 11/1926 | Spire | 29/156.7 R |
| 1,772,482 | 8/1930 | Ford | 29/156.7 R |
| 1,948,793 | 2/1934 | Lewis, Jr. | 29/156.7 R |
| 2,115,733 | 5/1938 | Krivobok | 123/188 AA |
| 3,497,349 | 2/1970 | Eppich | 123/188 A |
| 3,735,910 | 5/1973 | Watson et al. | 228/112 |

FOREIGN PATENT DOCUMENTS

| 253,012 | 12/1962 | Australia | 75/171 |
| 571,248 | 9/1958 | Belgium | 75/171 |

Primary Examiner—William R. Cline
Assistant Examiner—H. Jay Spiegel
Attorney, Agent, or Firm—Birch, Stewart, Kolasch & Birch

[57] ABSTRACT

An upset-forged poppet valve wherein at least the head portion and a part of the neck is made of a high temperature super alloy while the remaining portion is made of a conventional valve steel, said two materials being connected by friction welding before said valve is forged. The method comprises two steps of first friction-welding two rods of said two materials and then forming the connected single rod into the poppet valve by upset-forging.

3 Claims, 3 Drawing Figures

TEMPERATURE AT VARIOUS PORTIONS
OF AN EXHAUST POPPET VALVE

TEST CONDITION
PISTON DISPLACEMENT 2000cc
5500rpm X FULL LOAD
WATER TEMP. 90°C
OIL TEMP. 120°C

POPPET VALVE

BACKGROUND OF THE INVENTION

1. Field of the Invention

The present invention relates to a poppet valve for the intake and exhaust valves of an internal combustion engine and also relates to a method of producing same.

2. Description of the Prior Art

The poppet valve which is used as the exhaust valve of an internal combustion engine is exposed to corrosive exhaust gases under a high temperature condition such as above 800° C and, furthermore, it is subjected to strong tensile and bending stresses at its neck portion due to the spring force applied by the valve spring and its own inertia when it abuts against the valve seat. In addition to the oxydizing action effected by $CO_2$, $H_2O$, residual $O_2$, etc., contained in the hot exhaust gas, particularly in the gasoline engine, the exhaust poppet valve is effected by the hot corrosion due to the combustion products generated from lead compounds added to gasoline as an anti-knock substance. Furthermore, the face portion of the poppet valve undergoes friction wear due to frictional contact with the valve seat. Since the abovementioned various effects applied to the poppet valve become more serve as the output power and the rotational speed of the engine increase, there is a demand for even more improved poppet valves to improve the reliability of the engine and the design of a high speed engine.

To meet with this demand, a poppet valve having a stellite outer layer provided by melt-moulding is being used more and more used for the exhaust valve. However, the melt-moulding requires considerable skill and a complicated manufacturing process, whereby the manufacturing cost of this type of valve is relatively high resulting in an economical disadvantage. Also, this type of valve does not have sufficient durability to serve as an exhaust valve for modern high speed engines or engines designed for exhaust gas purification. For the use of the unleaded gasoline proposed in recent years, a valve seat insert is often used as a countermeasure therefor. When the valve seat insert is employed, the temperature of the exhaust poppet valve becomes higher than in the conventional case, whereby it is required that the high temperature strength and the resistance to high temperature corrosion properties of the poppet valve are improved. On the other hand, in those countries where high lead gasoline is still used, the exhaust poppet valve is required to have a high resistance to the lead compounds such as lead oxide, etc.

One of the materials that is at present most widely used for the exhaust poppet valve of the internal combustion engine is a valve steel having the composition: Fe—0.5C—21Cr—4Ni—9Mn—0.4N. However, for use under the severe operating conditions as encountered in the modern high performance engine, it is required that the valve, particularly the head portion thereof has a high temperature strength and resistance to oxygen, lead oxide etc. which are of a higher degree as compared with the abovementioned conventional valve steel.

As a super alloy material to meet with this severe demand, high temperature corrosion-resistant nickel base alloys have been proposed in Japaneses patent application No. 1671/74 filed by the same applicant as the applicant of the basic Japanese application of the present application. These alloys are characterized by the following composition: less than 0.15% C, 15–26% Cr, 1–10% Co, 5–18% Fe, more than 0.8% Ti, more than 0.8% Al, provided that Ti plus Al is between 1.6–5.0% and balance Ni and impurities, or less than 0.15% C, 15–26% Cr, 1–10% Co, 5–18% Fe, more than 0.8% Ti, more than 0.8% Al, provided that Ti plus Al is between 1.6–5.0%, less than 2% either Mo or W or both, and balance Ni and impurities.

Furthermore, according to our recent development, a super alloy having the composition: less than 0.05% C, 19.0–21.0% Cr, 1.0–3.0% Co, 2.5–3.0% Ti, 1.2–1.6% Al, 0.3–5% Nb +Ta, 11.0–13.0% Fe and balance Ni and impurities, has been found to particularly meet the severe operating conditions of the exhaust valve. This super alloy is advantageously upset-forged at a temperature of 1060–1130° C.

By employing these super alloys as the material for forming an exhaust poppet valve, it is possible to obtain a valve which has excellent high temperature strength and resistance to oxidization and corrosion by lead oxide, etc. However, since these super alloys are very expensive, a high cost is incurred if the entire body of the poppet valve is formed of these super alloys.

SUMMARY OF THE INVENTION

Therefore, it is the object of the present invention to obtain a substantial improvement in the performance of the exhaust poppet valve while controlling the cost to a reasonable level by forming only a limited portion, principally the head portion, of the poppet valve with the abovementioned super alloys under the consideration of the temperature condition and other loading conditions applied to the material in the operation of the exhaust valve.

According to the present invention, the abovementioned object is accomplished by providing an upset-forged poppet valve wherein at least the head and neck portions of said valve are made of a super alloy and the remaining stem portion of said valve is made of a conventional valve steel, wherein said super alloy portion and said conventional valve steel portion are connected by friction-welding before said poppet valve is forged. The method of producing the poppet valve comprises the steps of connecting a first rod made of a super alloy and having a quality sufficient to provide at least the head and neck portions of said poppet valve to a second rod made of a conventional valve steel having a quality sufficient to provide the remaining stem portion by friction welding thereby forming a single rod material, and then forming said rod material into said poppet valve by upset-forging.

BRIEF DESCRIPTION OF THE DRAWING

The present invention will become more fully understood from the detailed description given hereinbelow and the accompanying drawings which are given by way of illustration only, and thus are not limitative of the present invention, and wherein.

BRIEF DESCRIPTION OF THE PREFERRED EMBODIMENT

Figure 1:
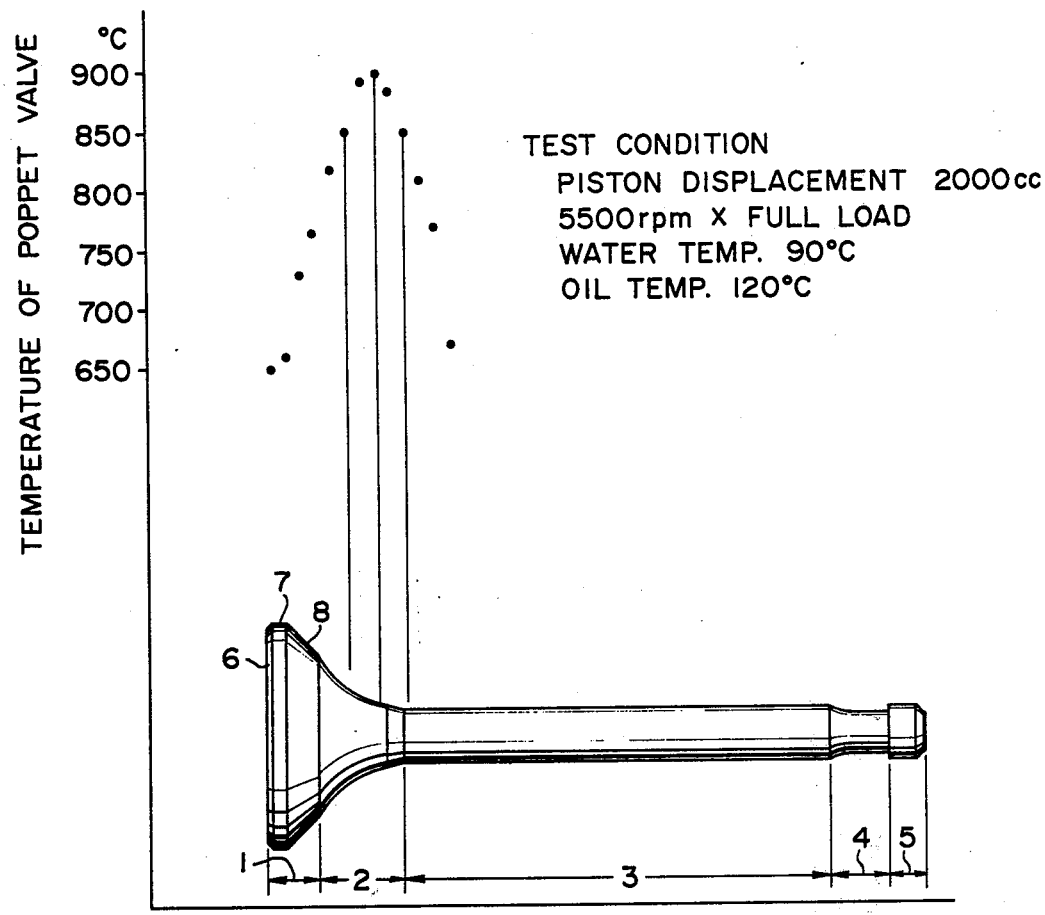
FIG. 1 is a graph showing an example of the operating temperature at various portions of an exhaust poppet valve; and, FIGS. 2 and 3 are side views showing two examples of the poppet valve formed according to the present invention.
Figure 2:
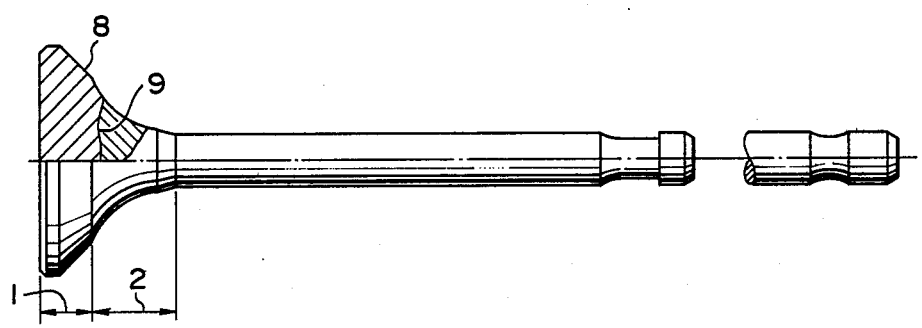

Referring to FIG. 1, the operating temperature at essential portions of the exhaust poppet valve is shown with reference to a poppet valve having a typical shape. As shown in the figure, the poppet valve includes a head portion 1, neck portion 2, stem portion 3, grooved portion 4 and stem end portion 5 arranged in series from its forward end toward its rearward end. The head portion 1 has faces such as end face 6, margin 7 and valve face 8. Among these portions, the portion which normally becomes hottest is an end portion of the neck portion 2 connecting to the stem portion 3, the temperature at said portion becoming so high as to be more than 850°–900° C in a modern high speed engine or an engine designed for exhaust gas purification, as shown in the figure. Judging from this temperature condition, it will be understood that the super alloys proposed in the aforementioned Japanese patent application No. 16711/74 may be employed for the head portion 1 and the neck portion 2. However, in the actual operation of the exhaust poppet valve, the abovementioned end portion of the neck portion 2 connecting to the stem portion 3 is contacted with only exhaust gas and not with the solid valve seat while, by contrast, the valve face portion 8 is liable to be damaged by a grinding action applied by combustion product particles which cause a deformation called "dishing" at the head portion 1 if the high temperature hardness or strength of the material is insufficient, not to mention that the valve face portion is more apt to be subject to corrosion by lead oxide, etc., if the material has insufficient resistance to high temperature corrosion. Therefore, if the use of the aforementioned super alloys is to be preserved under the condition that the exhaust poppet valve is further improved in relation to the cost thereof, the use of said super alloys should be limited to the head portion 1 and a portion of the neck portion 2, for example a portion within 5mm from the edge of the valve face 8. FIG. 2 is a side view, partly in section, of a poppet valve showing the manner of minimum use of the super alloy according to the present invention. As shown in this figure, the super alloy having an excellent high temperature performance such as proposed by the aforementioned Japanese patent application No. 16711/74 or the abovementioned super alloy discovered as a result of a further development, is used only for the head portion 1 and a part of the neck portion 2 extending a few milimeters from the edge of the valve face 8.

Figure 3:
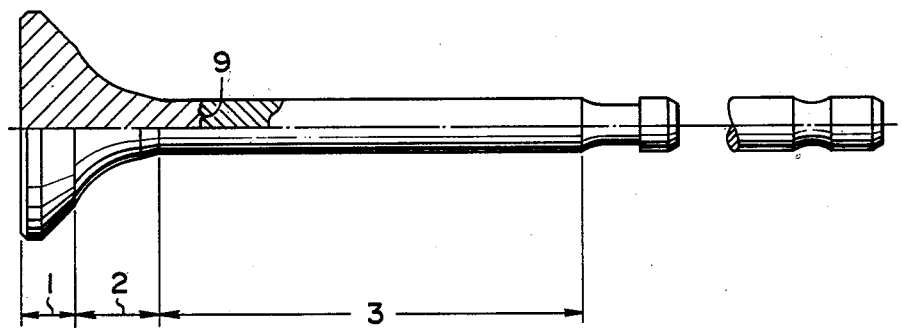

FIG. 3 is a side view, partly in section, of another poppet valve in which the use of the high temperature super alloy is somewhat increased from the minimum use as shown in FIG. 2 so that the super alloy forms even a part of the stem portion beyond the border between the neck portion and the stem portion.

The poppet valve of the present invention as shown in FIG. 2 or 3 is favorably produced by the steps of first connecting a first rod of a super alloy like the one proposed in the aforementioned Japanese patent application No. 16711/74 or the abovementioned super alloy proposed in the present application and a second rod of a conventional valve steel such as, for example, 21-4N by friction-welding to form a single rod material and then forming said rod material into the poppet valve by upset-forging in the same manner that the poppet valve is produced from a rod material of a conventional valve steel. The high temperature super alloys proposed in the Japanese patent application No. 16711/74 or the abovementioned super alloy produces a good friction-weld with the 21-4N steel and can be easily formed into a poppet valve by upset-forging. The interface 9 illustrated in FIGS. 2 and 3 is shown in the position where it is located when said single rod material made of said first and second rods has been formed into the poppet valve by upset-forging. Various tension tests have been applied to the poppet valve produced according to the present invention and, as a result, it has been confirmed that the breakage always occurs at a portion other than the head portion and the part of the neck portion formed of said high temperature super alloy. Furthermore, no trouble of breakage caused at the friction-welded portion of the poppet valve in the actual operation of the internal combustion engine has yet been encountered. Thus, it has been proved that the poppet valve and the method of producing the poppet valve according to the present invention is effectively and commercially employable.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An upset-forged poppet valve comprising a first portion which includes the valve head and at least a part of the valve neck and a second portion which includes the remaining portion of the valve including the valve stem, said first and second portions being bordered by a friction-welded joint formed prior to an upset-forging process of the valve, wherein said first portion is made of super alloy having a composition consisting essentially of less than 0.15% C, 15–26% Cr, 1–10% Co, 5–18% Fe, more than 0.8% Ti, more than 0.8% Al, provided that Ti plus Al is between 1.6–5.0% and the substantial balance being Ni and impurities, and said second portion is made of a conventional valve steel.

2. An upset-forged poppet valve comprising a first portion which includes the valve head and at least a part of the valve neck and a second portion which includes the remaining portion of the valve including the valve stem, said first and second portions being bordered by a friction-welded joint formed prior to an upset-forging process of the valve, wherein said first portion is made of a super alloy having a composition consisting essentially of less than 0.15% C, 15–26% Cr, 1–10% Co, 5–18% Fe, more than 0.8% Ti, more than 0.8% Al, provided that Ti plus Al is between 1.6–5.0%, less than 2% of either Mo or W or both, and the substantial balance being Ni and impurities, and said second valve portion is made of a conventional valve steel.

3. An upset-forged poppet valve comprising a first portion which includes the valve head and at least a part of the valve neck and a second portion which includes the remaining portion of the valve including the valve stem, said first and second portions being bordered by a friction-welded joint formed prior to an upset-forging process of the valve, wherein said first portion is made of a super alloy having a composition consisting essentially of less than 0.05% C, 19–21% Cr, 1–3% Co, 2.5–3.0% Ti, 1.2–1.6% Al, 0.3–0.5% Nb plus Ta, 11–13% Fe, and the substantial balance being Ni and impurities, and said second valve portion is made of a conventional valve steel.

* * * * *